United States Patent Office 3,574,763
Patented Apr. 13, 1971

3,574,763
PRODUCTION OF SATURATED CARBONYL COMPOUNDS
Johannes Wollner, 5 Nordstrasse, Kapellen Kreis Moers, Germany, and Wilhelm Neier, 29 Schillerstrasse, Homberg, Niederrhein, Germany
No Drawing. Continuation of application Ser. No. 651,396, July 6, 1967. This application July 25, 1969, Ser. No. 849,569
Claims priority, application Germany, July 7, 1966, R 43,650
Int. Cl. C07c 49/04
U.S. Cl. 260—593
5 Claims

ABSTRACT OF THE DISCLOSURE

This specification describes a novel process for the Aldol condensation of carbonyl-containing compounds of relatively low molecular weight to produce higher molecular weight $\alpha$-$\beta$ unsaturated carbonyl compounds which are hydrogenated to saturated carbonyl compounds as they are produced. There is described a novel catalyst for this reaction which is a strongly acid cation exchange resin having metallic reduced noble metal deposited thereon. The process is carried out using a solid bed catalyst in a trickle phase. Particularly exemplified is the production of methyl isobutyl ketone by the self-condensation of acetone.

---

This is a continuation of application Ser. No. 651,396 filed July 6, 1967 and now abandoned.

Aldol condensation reactions are well known. They are commercially used to produce a whole range of useful chemical products such as croton aldehyde and butyaldehyde (from acetaldehyde); oxide and methyl isobutyl ketone (from acetone); etc. It is known that the Aldoling reaction is carried out with the aid of an acid catalyst.

The Aldol condensation reaction results in an initial product which is an unsaturated carbonyl-containing compound. Often it is desired to produce a saturated carbonyl compound as the end or one of the intermediate desired products. For example in the production of butanol acetaldehyde is condensed to acetaldol which is converted to croton aldehyde which is hydrogenated to butyraldehyde which is reduced to butanol.

It is obvious that it would be desirable to combine as many of these steps as possible into a single operation for economy purposes. Thus in recent years efforts have been made to produce a saturated carbonyl compound as the direct product of Aldol condensation by combining the condensation and hydrogenation steps into a single operation where possible.

In German Pat. No. 1,193,931 there is described a one-step process for the manufacture of methyl isobutyl ketone in liquid phase at elevated temperatures up to 150° C. and at a hydrogen partial pressure of at least about one tenth of the total pressure with the use of a catalyst mixture consisting of a highly acid cation exchange resin and a hydrogenation catalyst which is selective with respect to the saturation of olefinic double bonds.

When the above-mentioned process is performed with the use of fluid catalyst beds, the utilization of the catalyst mixture is observed to be only fair due to constant back-mixing of the reaction mass. The catalyst mixture has an acceptable life, and yet technical difficulties occur during long-term continuous industrial operation which are due to lack of uniformity of the catalyst mixture. These difficulties stand in the way of the achievement of a genuine continuous combined Aldol condensation and hydrogenation process that can be commercially performed over long periods of time.

In the manufacture of methyl isobutyl ketone from acetone, for example, the reaction entails the formation of one mole of mesityl oxide from two moles of acetone, the mesityl oxide is then hydrogenated to form methyl isobutyl ketone. It is known that the mesityl oxide that is produced can itself continue to react with acetone, resulting in a whole spectrum of oligomeric and polymeric compounds. It has been observed that acetone, mesityl oxide and water are in equilibrium in the reaction zone, with the equilibrium percentage of mesityl oxide amounting to about 16%. It has been learned that, as the hydrogenation of the mesityl oxide continues, this equilibrium is progressively shifted, making it possible to achieve a substantially higher transformation of acetone to methyl isobutyl ketone. It is furthermore of the greatest importance that the highly reactive mesityl oxide formed from the acetone be hydrogenated to methyl isobutyl ketone immediately after its formation, in order to prevent it from entering into any reaction with the excess acetone present. Unless the reaction is controlled in such a manner that the mesityl oxide is immediately further hydrogenated as it is produced, it reacts with acetone to form the above-mentioned oligomeric or polymeric compounds which represent undesired byproducts and under certain circumstances may result in a cementing together of the highly acid cation exchanger and the palladium hydrogenation catalyst which is on an inert supporting material. This can be the cause of carbonization and clogging in the reaction chamber and can necessitate the stopping of the reaction for cleaning up and recharging the reactor with fresh catalyst.

To eliminate this trouble in fluid bed reactors, an attempt has been made, by means of high-speed gassing agitators, to achieve a distribution approaching the ideal distribution of the catalyst mixture. However, the high relative velocity of the catalyst particles relative to the edges of the agitator result in comminution of the catalyst particles and in a wearing down of the edges of the agitator blades. The attrition of fine catalyst increasingly complicates the filtration of the acetone-methyl isobutyl ketone reaction product mixture as operation continues, whereas the metal particles eroded from the agitator are immediately dissolved in the reaction mixture, even in the case of high-grade steel, since their minute size offers a very large surface in comparison to the volume. The dissolved heavy metal ions are absorbed by the ion exchange resin and increasingly block its active acid groups. Consequently the activity of the catalyst mixture constantly diminishes and the formation of byproducts increases.

A further attempt has been made to achieve an improvement of the catalyst distribution by pressing the highly acid cation exchange resin and the hydrogenation catalyst supported on inert material into briquettes of precisely the same shape and size, but this measure has not permitted an ideal catalyst distribution because of the difference in the specific weight of the two substances.

In order to avoid the above-described effect of the comminution of the catalyst mixture by the high-speed gassing agitator and the wear on the agitator which this produces, it has been attempted to perform the reaction in a vertically standing reaction tube in which, for example, the reaction mixture of acetone and catalyst is blown upward and mixed by hydrogen gas introduced at the bottom and rising in the reaction tube. Here again the problem is encountered that the difference in the specific weight of the individual components of the catalyst mixture prevents an ideal distribution of the catalyst mixture, so that again the above-described difficulties occur. Furthermore, in this method of carrying out this process in a fluid catalyst bed, a complete back-mixing of the reaction mixture constantly takes place in the reactor, which in turn results in a relatively poor utilization of the catalyst mixture.

It is in the prior art, in the manufacture of alcohols and ethers by hydrating olefins, to use as catalysts highly acid cation exchange resins in which 25 to 75% of the hydrogen ions are replaced by heavy metal ions. The use of such cation exchange resins containing heavy metal ions presumably should result in better thermal stability in the highly acid cation exchanger.

It is an object of this invention to provide a novel process for the production of saturated carbonyl containing compounds by an Aldol condensation-hydrogenation reaction.

It is another object of this invention to provide a novel catalyst for this reaction.

It is a further object of this invention to provide an improved reaction scheme for carrying out Aldol condensation reactions.

It is still another object of this invention to provide a novel control means for use with Aldol condensation reactions.

Other and additional objects of this invention will become apparent from a consideration of this entire specification including the claims hereof.

In accord with and fulfilling these objects, one aspect of this invention resides in a novel catalyst which is particularly useful to catalyze the condensation of carbonyl containing compounds and simultaneously hydrogenate the condensation products to produce saturated carbonyl-containing products.

The catalyst of this invention is a solid, strongly acid cation exchange resin which has applied to the surface thereof metallic noble metal. This catalyst can be prepared by impregnating and coating a strongly acid cation exchange resin with a noble metal salt solution. The solvent is evaporated leaving the cation exchange resin having the noble metal salt applied thereon. This material is then subjected to reducing conditions whereby the noble metal salt is converted to noble metal on the cation exchange resin. This is the composite catalyst of this invention.

The noble metal may be any of those having known hydrogenation catalysis properties such as palladium, ruthenium, rhodium, platinum, etc. The salt may be any anion which renders the noble metal soluble in the selected solvent and which is removable from the noble metal under reducing conditions. Generally, the halide salts, and particularly the chloride salt, are chosen because of ready economic availability and ease of use. Further with the chloride salt, it can be readily determined when the reduction reaction is complete or substantially complete by measuring the quantity of chloride present in the reducing reaction effluent. The solvent can be substantially any material which dissolves the noble metal salt, is inert to both the noble metal salt and the cation exchange resin and can be easily and readily evaporated, leaving the noble metal salt behind, at moderate temperatures. Water is the preferred solvent.

The strongly acid cation exchange resin may be any of those which are commercially available or which may be developed, such as sulfonated styrene-divinyl benzene copolymer or acid charged solid materials, such as bentonite, etc.

The reducing reaction is preferably carried out at elevated temperatures according to conventional reducing techniques well known in the art with the aid of a reducing gas. Such reducing gas usually comprises hydrogen either alone or in admixture with other components, as is well known.

A further aspect of this invention resides in the carrying out of an Aldoling-hydrogenation reaction whereby carbonyl-containing compounds, such as relatively short chain aldehydes and ketones, are condensed to produce longer chain carbonyl-containing compounds. In contrast to the prior art techniques, this process is carried out in the presence of a solid, fixed bed catalyst. The reaction is carried out in a trickle phase in contact with this fixed bed catalyst. Thus in one embodiment of this invention, the reaction zone is a vertical tubular reactor having solid catalyst coprising strongly acid cation exchange resin particles having noble metal hydrogen cation catalyst thereon. The feed carbonyl compound is fed as a liquid from the top of the reaction zone at such rate that it trickles down the catalyst bed. The hydrogen or other hydrogenating gas is also fed from the top of the reaction zone. The product saturated carbonyl compound is recovered from the bottom of the reaction zone.

The present invention combines the full activity of the solid acid catalyst for the condensation reaction of carbonyl compounds (e.g. for the condensation of two moles of acetone to mesityl oxide) directly with the action of a hydrogenation catalyst responding to the olefinic double bond of the $\alpha,\beta$-saturated carbonyl compound that develops.

The solid catalyst described above, which can perform two functions, is surprisingly resistant to attrition, and is therefore outstandingly well suited for use as a solid-bed catalyst for the manufacture of saturated high carbonyl compounds in a trickle bed process by the reaction of carbonyl compounds with hydrogen on this catalyst. The preferred form of the reactor holding the catalyst of the invention is a continuously operating trickle tower. In addition to the greater resistance to attrition, the long life of the new catalyst, together with its constant high performance, was exceptionally surprising, inasmuch as it could not be anticipated that the direct adjacency of active noble metal, such as palladium, and sulfonic acid groups on the same support particle would not result in a mutual negative effect on the two different catalyst functions and hence in a rapid loss of catalyst activity.

The process of the invention will be further explained with reference to the reaction of acetone with hydrogen to produce methyl isobutyl ketone. Acetone and hydrogen are reacted at elevated temperatures of about 80–250° C., preferably about 120–140° C., and at pressures of about 10 to 50 atmospheres, preferably about 25 to 35 atmospheres, on the solid-bed catalyst according to the invention.

One particular advantage of the use of the catalyst of the invention as a trickle catalyst consists in the substantial avoidance of the back-mixing of the reaction mixture in the liquid phase, which is not possible in continuous processes utilizing a fluid bed catalyst in which the catalyst is suspended in the liquid. This deficiency in turn results in a low conversion of the acetone as it passes through the reactor, and also in a substantially lower yield per unit of volume per unit of time, since it has been observed that the rate of formation of the methyl isobuyl ketone decreases rapidly as the acetone concentration diminishes and the amount of reaction water in the reaction mixture increases. When the new catalyst is used in the trickle bed, a maximum rate of formation of methyl isobutyl ketone is achieved in the initial stage of the reaction, i.e. upon the entry of the undiluted acetone, for example, so that in this stage the yield per unit of volume per unit of time is extraordinarily high and exceeds by several times the yields of other continuous processes entailing back-mixing.

As a result of the constant conversion of acetone to methyl isobutyl ketone, the acetone concentration of the reaction mixure diminishes more and more as it continues on its course through the trickle catalyst bed, owing to the formation of methylisobutyl ketone and water of reaction, which results in an increasing retardation of the forming of methyl isobutyl ketone.

Still another aspect of this invention resides in the fact that it is now possible to exercise a lasting influence on the reaction in all of its phases by controlling the reaction temperature along the length of the reactor. For example, it may be advantageous to divide the reaction tube into two or more sections, of which the upper section requires the most intensive cooling on account of the greater amount of heat produced in it (heat of reaction=approximately 32 Kcal./mole of methyl isobutyl ketone). The reactor sections which adjoin it further down require less cooling as the rate of reaction diminishes. Under certain circumstances it is necessary to raise the reaction temperature in those sections above the temperature in the upper sections. The best coolant is water under pressure, which is recirculated through a heat exchanger.

Another possibility of assuring the removal of the considerable amounts of heat from the upper portion of the length of the reactor consists in thinning the catalyst of the invention in the upper portion of the reactor tube with a neutral filler to an extent determined by the locally prevailing rate of reaction. If a cation exchange resin is used as the solid-bed catalyst, it is advantageous to thin or dilute it with the inactive sodium salt form of the cation exchanger used for the production of the new catalyst.

The dilution can also be performed by progressively augmenting the amount of filler from the top to the bottom of the entire reactor at a rate proportional to the rate of product formation. In this case it is even possible to cool the entire length of the reactor with a coolant that is at the same temperature in all phases. In this case the coolant, for example water under pressure, is recirculated in a single recirculation system.

The concentration of the palladium on the solid-bed catalyst can vary greatly. It is expedient, however, to use palladium contents of 0.1 to 10%. Particularly desirable are palladium contents ranging from 1 to 3% by weight.

The following examples are illustrative of the practice of this invention without in any way being limiting thereon.

EXAMPLE 1

One liter (=408 g. of dry substance) of a highly acid cation exchanger made on a polystyrene-divinylbenzene basis, e.g. Dowex 50 W–X8 in the hydrogen ion form, is mixed in the moist state with an aqueous 2 N hydrochloric acid solution of 12.6 g. of palladium chloride, and the solution is uniformly distributed through the cation exchanger by shaking. Then the water is removed in a rotatory vacuum evaporator until the substance is dry; this produces a uniform coating of the noble metal salt on the cation exchanger.

The palladium chloride charged catalyst is then heated to about 100° in a glass column equipped with a heating jacket, while hydrogen is passed through it, thereby reducing the palladium salt to palladium metal. Hydrogen is passed through it until practically no more hydrogen chloride can be detected in the exhaust gas. The heating jacket is shut off and the catalyst is cooled in a current of nitrogen. It is then ready for direct use in the manufacture of the above-described high carbonyl compounds.

The manufacture of methyl isobutyl ketone (MIBK) is performed in a tubular pressure vessel made of V4A steel, which has a diameter of 26 mm. and a length of 2.40 m., and which is filled with the above-described bifunctional solid-bed catalyst. The cooling jacket of the reaction tube consists of two sections of 1.20 m. each, which can be cooled independently of one another with water under pressure at different temperatures. The heat is removed by an air-cooled heat exchanger fed by a circulation pump. The temperature in the reaction chamber is measured over the entire length of the reactor by means of a thermocouple in a 6 mm. thermometer tube mounted axially in the reaction tube and extending through its entire length.

By means of a proportioning pump, 2.41 liters of acetone preheated to about 120° is fed hourly into the top of the reactor, while 180 liters of hydrogen are fed hourly also into the top of the reactor. A pressure of 30 atmospheres is maintained, with a water circulation temperature of 95° in the upper section of the jacket and about 126° in the lower section. Maximum temperatures of about 140° are produced in the upper section of the reactor, and of about 137° in the lower section. The reaction product leaving the bottom of the reactor is first separated in a cooled pressure separator into a liquid phase and a gaseous phase. The two phases are released separately from the pressure chamber. By the deep cooling of the emerging hydrogen vapors (12 to 20 liters per hour) a small portion of the reaction product is won from the gaseous phase and is combined with the main body of the product that is drawn off in liquid form. The composition of the raw ketone product is as follows:

|  | After 139 hours b, percent | After 567 hours c, percent | After 800 hours, percent |
| --- | --- | --- | --- |
| First runnings | 0.55 | 0.44 | 0.5 |
| Acetone | 54.0 | 55.70 | 54.7 |
| Isopropyl alcohol | 1.6 | 1.0 | 1.3 |
| Methyl isobutylketone, MIBK | 34.7 | 34.1 | 34.5 |
| Diisobutyl ketone, DIBK | 1.3 | 1.3 | 1.3 |
| Higher ketones | 0.65 | 0.56 | 0.6 |
| Water | 7.2 | 9.60 | 7.1 |

Accordingly, the MIBK yield per unit of volume per unit of time amounts to 566 grams per liter of catalyst volume per hour, or 1350 grams of MIBK per kg. of solid-bed catalyst per hour.

EAMPLE 2

The reaction tube described in Example 1 is filled in the upper cooling section with a well distributed mixture of 70 parts of a solid-bed catalyst manufactured as prescribed above, having a palladium content of 1.5%, and 30 parts of the sodium-salt form of the cation exchanger Dowex 50 W–X8. The bottom cooling section, however, is filled with a straight 1.5% palladium solid-bed catalyst. 2.4 liters per hour of acetone and 200 liters per hour of hydrogen are fed into the top of the reactor, and the upper section of the cooling jacket is fed with recirculated water at 125° while the lower section is fed with water under pressure at a temperature of 130°.

The raw ketone produced is composed as follows:

| | Percent |
| --- | --- |
| First runnings | 0.5 |
| Acetone | 52.5 |
| Isopropanol | 0.3 |
| MIBK | 37.4 |
| DIBK | 1.4 |
| Higher ketones | 0.6 |
| Water | 7.3 |

The MIBK yield per unit of volume per unit of time accordingly amounts to 586 grams per liter of catalyst volume per hour, or 1640 grams of MIBK per kg. of solid-bed catalyst per hour.

EXAMPLE 3

The reaction tube is made of W4A steel, has an inside diameter of 26 mm. and a total length of 3.60 m., and is divided into 3 cooling sections each 1.20 m. long. The top third of the reaction tube is filled with a mixture like that of Example 2, consisting of 70% solid-bed catalyst with a palladium content of 1.5% and 30% sodium salt form a Dowex W 50–X8, and the middle and bottom thirds are filled with a straight 1.5% palladium solid-bed catalyst.

The top cooling zone is cooled with recirculated water under pressure at 125°, the middle zone with water at 130° and the bottom zone with water at 135°. Acetone preheated to 120° is fed into the top of the reactor at the rate of 2.4 liters per hour, along with 250 liters of hydrogen, and a quantity of raw ketone is let out hourly from the bottom end that corresponds to the amount of acetone put in, plus about 30 liters of hydrogen. The raw ketone has the following composition:

| | Percent |
|---|---|
| First runnings | 0.5 |
| Acetone | 43.3 |
| Isopropanol | 0.3 |
| MIBK | 44.5 |
| Diisobutyl ketone | 2.0 |
| Higher ketones | 0.7 |
| Water | 8.7 |

The yield of MIBK per unit of volume per unit of time amounts to 439 grams per liter of catalyst volume per hour or 876 g. per kg. of solid-bed catalyst per hour.

The cation exchanger described particularly in Example 1 may be replaced without materially changing the reported results by other resins of this type which are commercially available as for example "Amberlite IR 120" or "Amberlite 200" and the like. The usual commecial form of these exchange resins, i.e. pearls or granules, has been found suited for the purpose of the invention though in some instances another form, as for example threads or rodlets, may be advantageous. As to the hydrogenating metal catalyst which according to one aspect of the invention is precipitated on the aforesaid resin granules the noble metals already mentioned may be substituted by cobalt and/or nickel, as is well known in the art. Though the latter are less expensive their reduction directly on the resin granules (as for palladium chloride is disclosed in Example 1) seems more difficult.

In addition to the methods already disclosed the process of the invention may be performed in the presence of an appropriated diluent or solvent which may be helpful in controlling or dissipating the heat of reaction and/or may enhance further the selectivity of the catalyst to reduce the amount of undesired by-products or to increase the useful life or efficiency of the new catalysts. The said diluents may be miscible with the starting ketone or may not, they further may not essentially be inert under the conditions of the process described. So some minor amounts of water, i.e. 2 to 4 weight percent in the starting ketone, have been found to increase the useful life of the new catalysts appreciably and simultaneously increase the yield of the desired MIBK.

What is claimed is:

1. In the process for the continuous Aldol condensation of carbonyl-containing compounds selected from the group consisting of aldehydes and ketones and hydrogenation of the condensation product to produce saturated carbonyl-containing compounds at about 80 to 250° C. and about 10 to 50 atmospheres of higher molecular weight than the reactant carbonyl compounds; the improvement which comprises carrying out said reaction in a trickle phase in the presence of a solid, fixed bed catalyst which catalyst comprises a strongly acid cation exchange resin having metallic noble metal precipitated on the surface thereof.

2. The improved process claimed in claim 1 wherein said carbonyl compound reactant in the liquid phase and a gas comprising hydrogen are fed downwardly in contact with said catalyst.

3. The improved process claimed in claim 1 wherein said noble metal is at least one member selected from the group consisting of palladium, rhodium, ruthenium and platinum.

4. The improved process claimed in claim 1 including providing as part of said solid catalyst bed particles of inert material.

5. The improved process claimed in claim 1 wherein said carbonyl reactant is acetone and said product is methyl isobutyl ketone.

References Cited

FOREIGN PATENTS

| 717,810 | 11/1954 | Great Britain | 260—593 |
| 994,137 | 6/1965 | Great Britain | 260—593 |
| 1,015,003 | 12/1965 | Great Britain | 260—593 |
| 1,112,047 | 8/1961 | Germany | 252—430 |

OTHER REFERENCES

Collier: "Catalysis in Practice," pp. 90, 91, 95, 100 and 101 (1957).

BERNARD HELFIN, Primary Examiner

U.S. Cl. X.R.

260—601; 252—430